Jan. 1, 1957  E. F. MOORE ET AL.  2,776,405
ELECTRICAL CIRCUIT ANALYZER
Filed May 18, 1953  9 Sheets-Sheet 1
FIG. 1
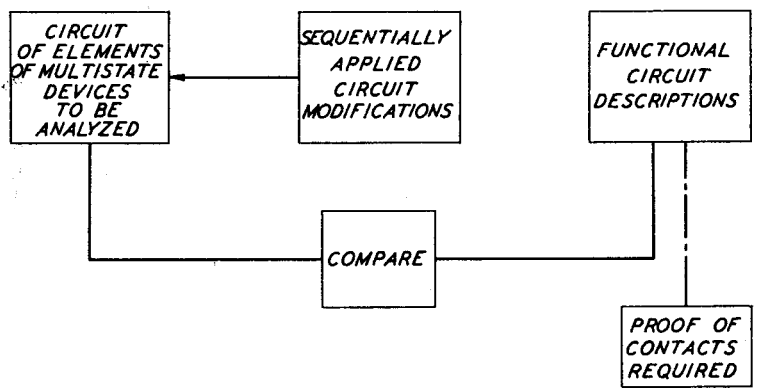
FIG. 3A
BEFORE
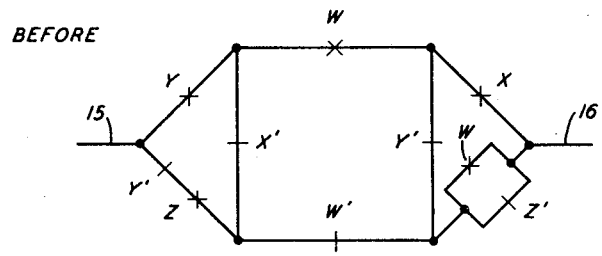
FIG. 3B
AFTER
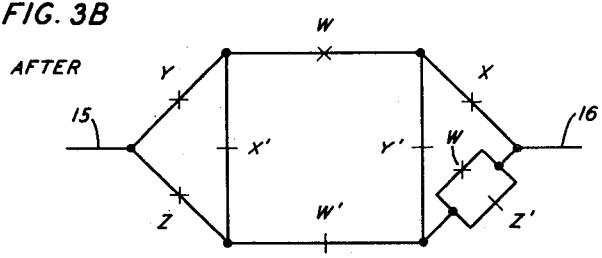
FIG. 10
| FIG. 4 | FIG. 5 | FIG. 6 |
|--------|--------|--------|
| FIG. 7 | FIG. 8 | FIG. 9 |
INVENTORS: E. F. MOORE
C. E. SHANNON
BY
ATTORNEY

INVENTORS: E. F. MOORE
C. E. SHANNON
BY
ATTORNEY

Jan. 1, 1957   E. F. MOORE ET AL.   2,776,405
ELECTRICAL CIRCUIT ANALYZER
Filed May 18, 1953   9 Sheets-Sheet 8
FIG. 9
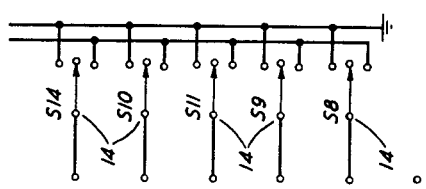
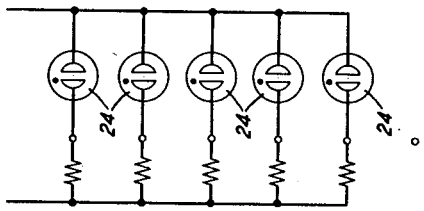
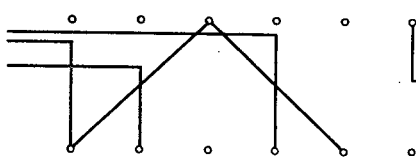
INVENTORS: E. F. MOORE
C. E. SHANNON
BY
ATTORNEY

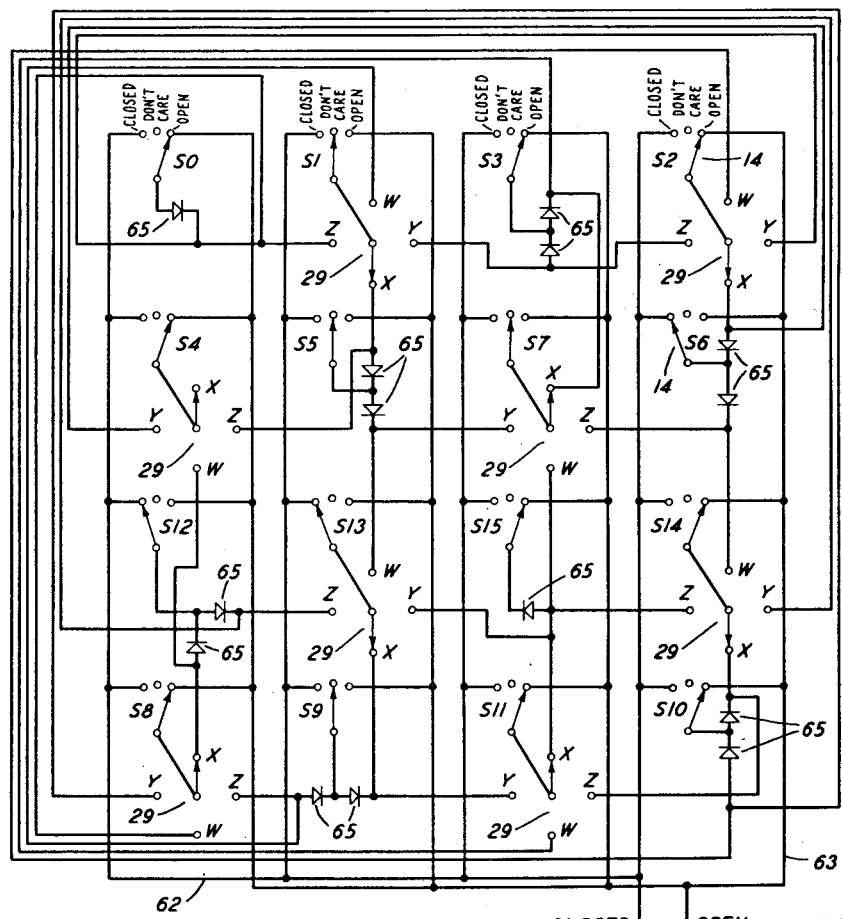
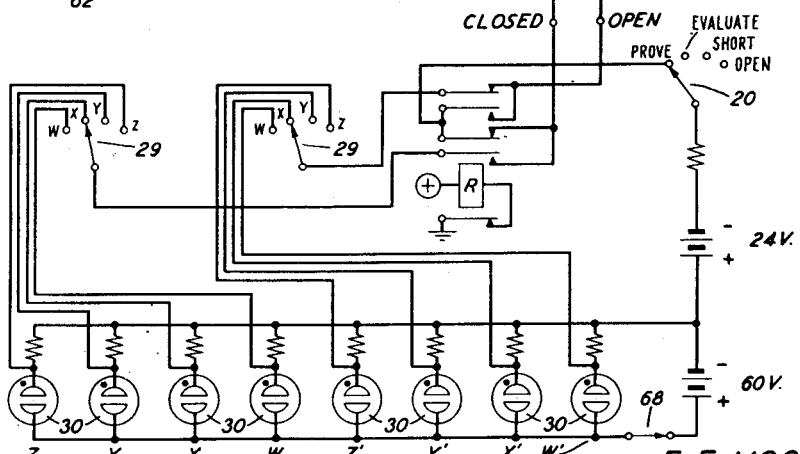
FIG. 11
INVENTORS: E. F. MOORE
C. E. SHANNON
BY
ATTORNEY

United States Patent Office 2,776,405
Patented Jan. 1, 1957

2,776,405

ELECTRICAL CIRCUIT ANALYZER

Edward F. Moore and Claude E. Shannon, Chatham, N. J., assignors to Bell Telephone Laboratories, Incorporated, New York, N. Y., a corporation of New York Application May 18, 1953, Serial No. 355,516

29 Claims. (Cl. 324—73)

This invention relates to apparatus for analyzing electrical circuits and more particularly to apparatus for analyzing circuits of the types employed in switching operations.

Logic circuits of various kinds are finding applications in ever increasing numbers in systems being designed in which switching operations occur, two prominent examples of which are telephone systems and computers. In the design and construction of each such system, it is essential to design a large number of logic or switching circuits which present relatively simple or routine problems. In the past, these problems have been attacked in a cut-and-try manner. More recently mathematical approaches, based on Boolean algebra, mathematical theorems, and some carefully devised charts, tables, or plotting boards have been developed to aid in circuit design. In each instance, however, it has been necessary that the circuit, in the end, be worked out by human effort. Thus even with the aid of the mathematics, theorems, charts, etc., an engineer or mathematician has had to do considerable calculations in order to design even relatively uncomplicated switching or logic circuits. And when a circuit has been designed which will achieve all the conditions imposed on it by the system requirements, considerable further effort is required to attempt to simplify it and to ensure that it is enabled when, and only when, the requirements of the system prescribe that it be.

These logic and switching circuits may be relay circuits or various electronic circuits, including ferro-electric devices, ferromagnetic devices, diodes, discharge devices, transistors, etc., wherein a number of multistate devices or elements controlled thereby are connected to a given set of terminals to allow connections between or signals on certain of the terminals under certain conditions, which are control conditions. If relays are the devices employed, the particular circuit configuration that is to be designed may comprise combinations of the contacts of those relays, either normally open or normally closed, and the control conditions are imposed on the coils of the individual relays.

It is a general object of this invention to facilitate the design and evaluation of circuit configurations of multistate devices or of elements controlled thereby. More specifically, it is an object of this invention to enable apparatus automatically to perform operations on a circuit configuration to be investigated in lieu of an individual's attempting, by calculation and mental effort, to perform the same operation.

Further objects of this invention include providing apparatus to evaluate the behavior of a given circuit configuration of multistate devices or of elements controlled by such multistate devices, to compare the behavior of a circuit configuration with the requirements that are to be met by the circuit configuration, and to determine if the same behavior could be obtained by employing fewer of those elements, as by shorting out or omitting certain elements. While it may be surprising that a person could not readily tell by simple inspection whether a given element in a circuit could be shorted or omitted without affecting the characteristics of the circuit, in all but quite simple examples such redundant elements are often far from obvious. This is particularly true in case the particular circuit to be analyzed includes a bridge because of the complications involved in tracing out all possible paths in a bridge circuit.

It is a further object of this invention to establish a lower bound for the number of relay contacts that are necessary to attain the desired requirements imposed on a relay circuit being designed.

It is a still further object of this invention to aid in the design and evaluation of relay circuits employing any number of contacts of a given number of relays.

These and other objects of this invention are attained in one specific embodiment wherein apparatus is provided for analyzing two-terminal circuits made up of contacts of four relays. It should be emphasized, however, that the principles of this invention except for the proof of the lower bound are not limited to the design of relay circuits, to two-terminal networks, or to any particular number of control devices or relays. Nor is the proof of the lower bound of contacts limited to a two-terminal network or to any particular number of relays. The particular embodiment described herein is to be understood as merely illustrative of the application of the principles of the invention, having been chosen as being of a convenient size to describe. Each addition of a control device, as when it is desired to employ apparatus in accordance with this invention to facilitate the design and evaluation of circuits involving five or more relays, would approximately double the size of the apparatus and quadruple the length of time for its operation.

In this specific illustrative embodiment, the circuit to be analyzed is registered or set up in a jack field, as by means of plugs. The permissible behavior of that circuit is registered permanently in another part of the apparatus. By means of selector or step-by-step switches the circuit to be analyzed is compared separately with each possible behavior characteristic. If the circuit is to be only evaluated the apparatus will indicate which behavior characteristics the circuit has. The expression "behavior characteristic" or "behavior" means the condition or conditions of operation of the circuit; thus, considering the circuit to consist of contacts of four relays, W, X, Y and Z, connected between two terminals, the circuit is either open or closed for a given combination of operation of the four relays. For four relays there are sixteen possible combinations in which the circuit being analyzed may be open or closed.

If the behavior characteristic required is known, it can be set up in the apparatus and the circuit behavior then compared with that required. Further, by individually shorting out or opening each contact or element in the circuit configuration being analyzed and comparing the circuit configuration, as thus modified, with the required behavior, the apparatus can ascertain whether certain contacts or elements are in fact redundant and could be omitted with no change in circuit behavior.

In order to determine a lower bound for the number of contacts required, each of a group of switches which indicate a possible behavior characteristic is set to the proper or desired characteristic. These switches are interconnected by contacts on another switch, which can be set to any one of a number of positions equal to the number of multistate devices or relays of the circuit, so that, with the second-mentioned switch set to a given position, current will flow only if a contact of the relay of that position is required. By checking for the flow of current in both directions, the circuit will determine whether at least one normally open and normally closed contact is required.

It is therefore a feature of this invention that a circuit of elements of multistate devices be registered in apparatus for analyzing that circuit and that any one of the possible combinations of circuit functions of those elements be also registered in the apparatus, means being provided for comparing the circuit and the functional descriptions thus registered either to evaluate the circuit or to note agreement between the circuit and the particular functional descriptions registered.

It is a further feature of this invention that any one of the possible circuit functions be registered by causing a group of multistate devices sequentially to assume all their different states in all possible combinations and, for each such combination, setting a switch to the requirement for that particular function. Specifically it is a feature of this invention that the switches may be set to any of three conditions for each possible combination, the three conditions indicating that a particular combination must be a function of the circuit, must not be a function of the circuit, or that it is immaterial whether it be a function of the circuit or not.

Further it is a feature of this invention that the circuit to be analyzed be set up by connecting various points in a field which includes elements controlled by the multistate devices and then by individually excluding each of these elements from the circuit comparing the circuit as thus altered with the functional descriptions set up in the apparatus to determined if any of the elements employed in the circuit are redundant.

It is a still further feature of this invention that the combination of states of the multistate devices be obtained in the apparatus by connecting the multistate devices to contacts on a multiposition stepping or selector switch, the combination being altered by each advance of the stepping switch one position. Further in accordance with this feature of the invention, it is a feature that the switch indicating the requirement to be imposed on each particular combination of states of the elements be connected to contacts in the same positions on another level of the stepping switch.

Further it is a feature of this invention that each element of the multistate devices in part defining the register field for the circuit to be analyzed be itself connected to contacts at a position of a second stepping switch and that the wipers of the second stepping switch be movable one position after the first stepping switch has completed a cycle, whereby the necessity of each element defining a state in the circuit being analyzed may be individually determined by comparing it with all the functional requirements to be imposed on the circuit being analyzed.

Further it is a feature of this invention that the possible combinations of states of $n$ relays be arranged as vertices of an $n$-dimensioned cube, a switch being provided at each vertex to connect those combinations which must be closed to one voltage and those combinations which must open to another voltage, those combinations which are immaterial being unconnected, and unidirectional current elements be provided between vertices representing the opposite conditions of any device so that the flow of current from one vertex to the other indicates that an element of that state is essential.

A complete understanding of this invention and of these and various other features thereof may be gained from consideration of the following detailed description and the accompanying drawing, in which:

Fig. 1 is a generalized block diagram showing the functional elements of an illustrative embodiment of apparatus in accordance with this invention;

Fig. 3A illustrates one particular relay circuit that may be analyzed by the apparatus in accordance with this invention, Fig. 3B being the same circuit after simplification by an analysis performed by the apparatus;

Figure 2:
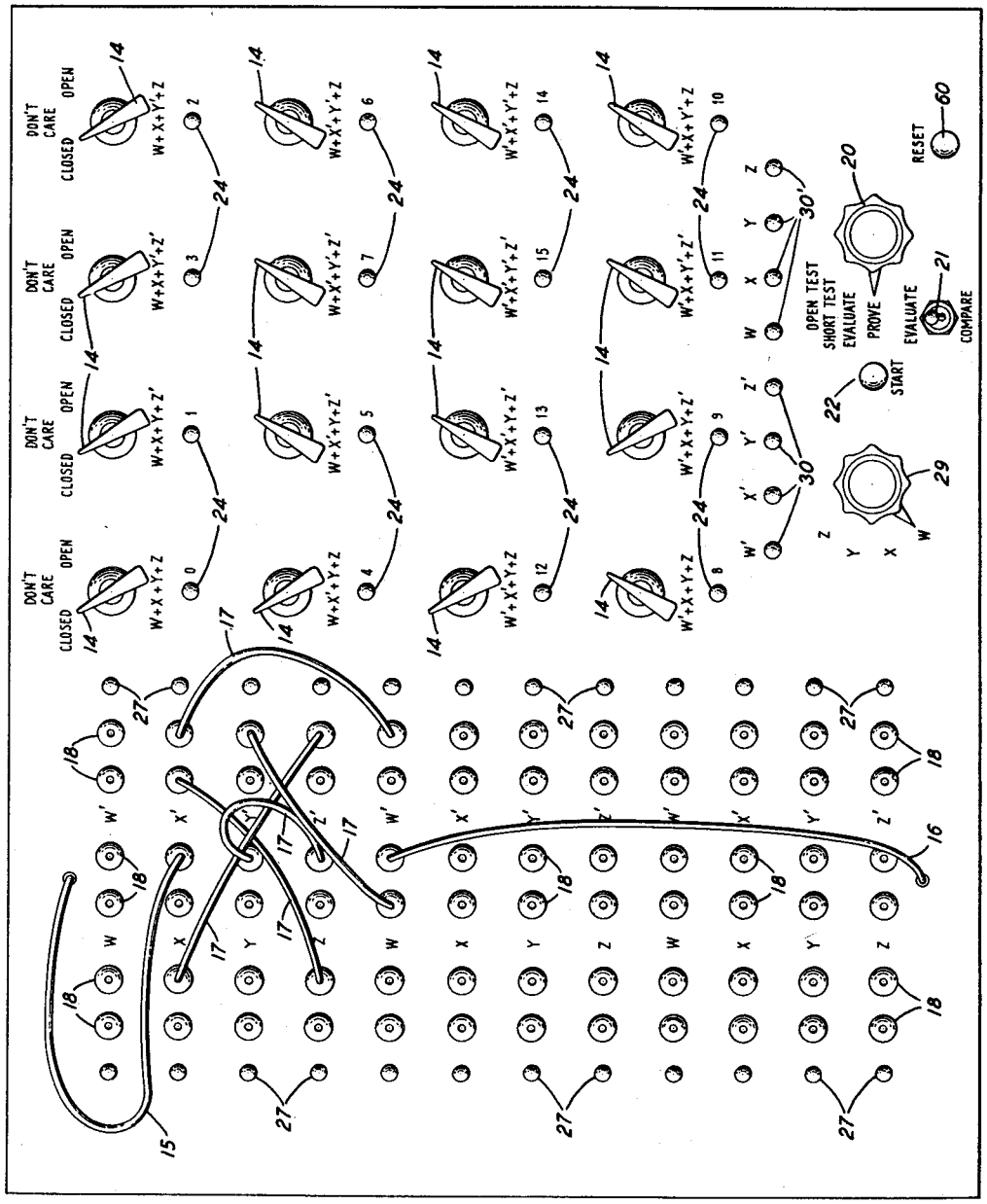
Fig. 2 is a plan view of the top panel of one specific apparatus constructed in accordance with this invention.
Figure 4:
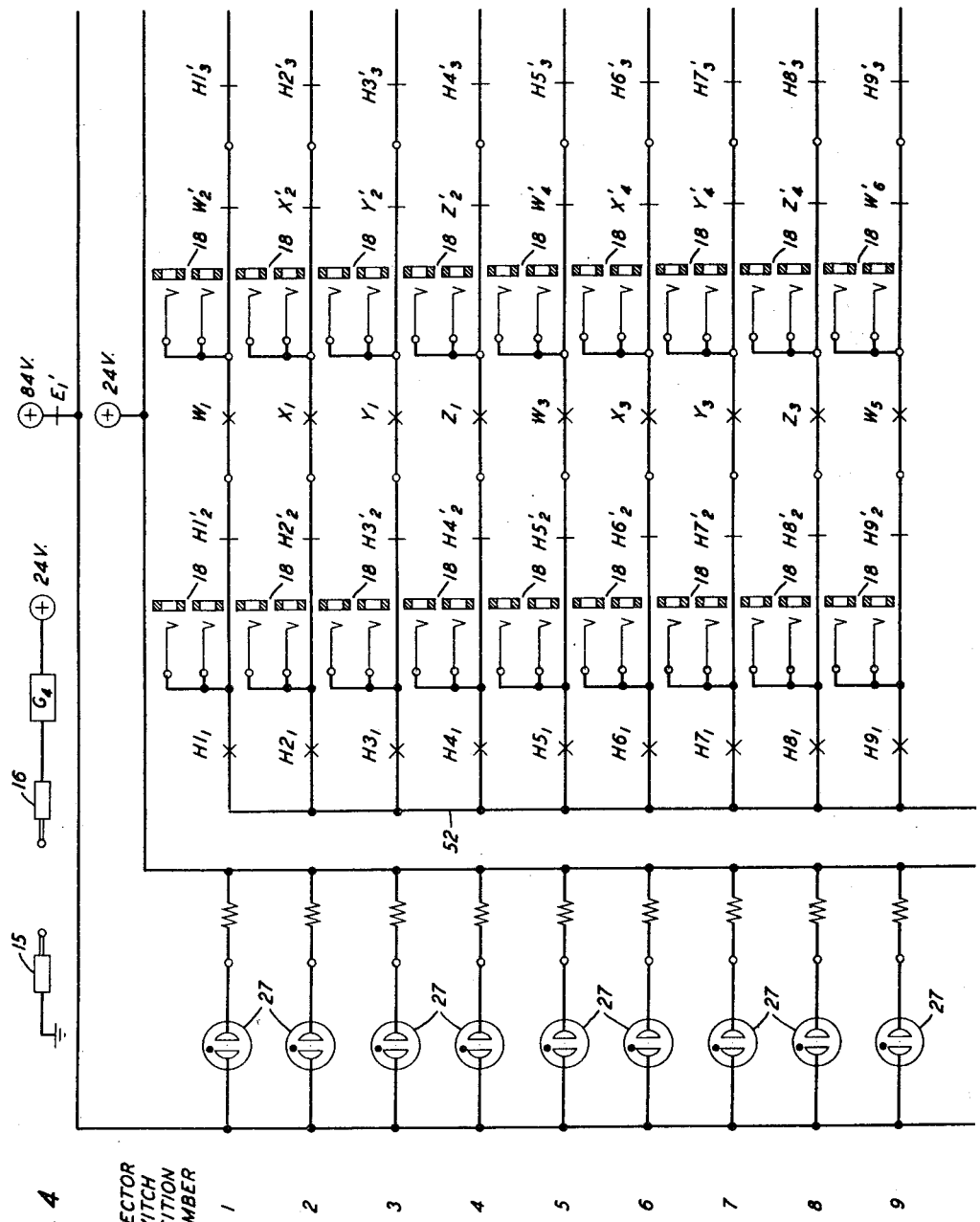
Figure 5:
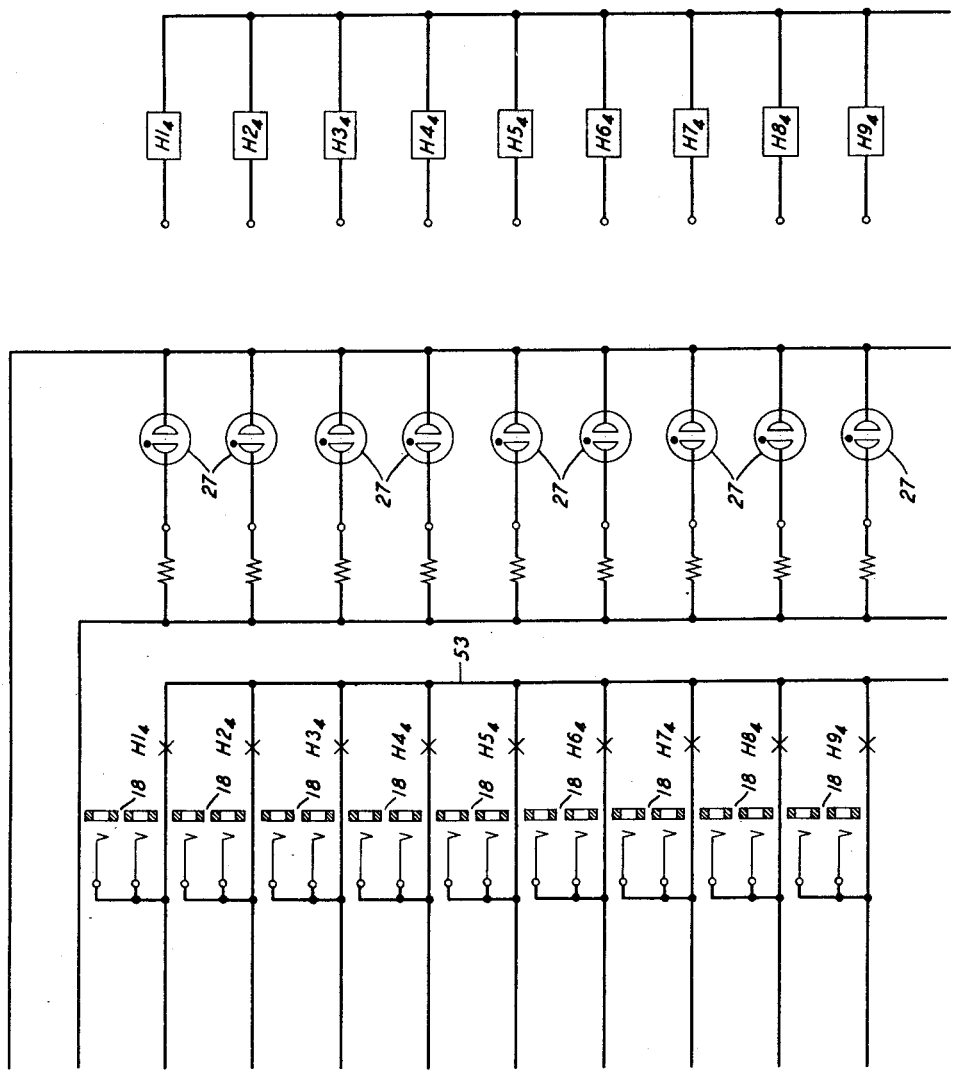
Figure 6:
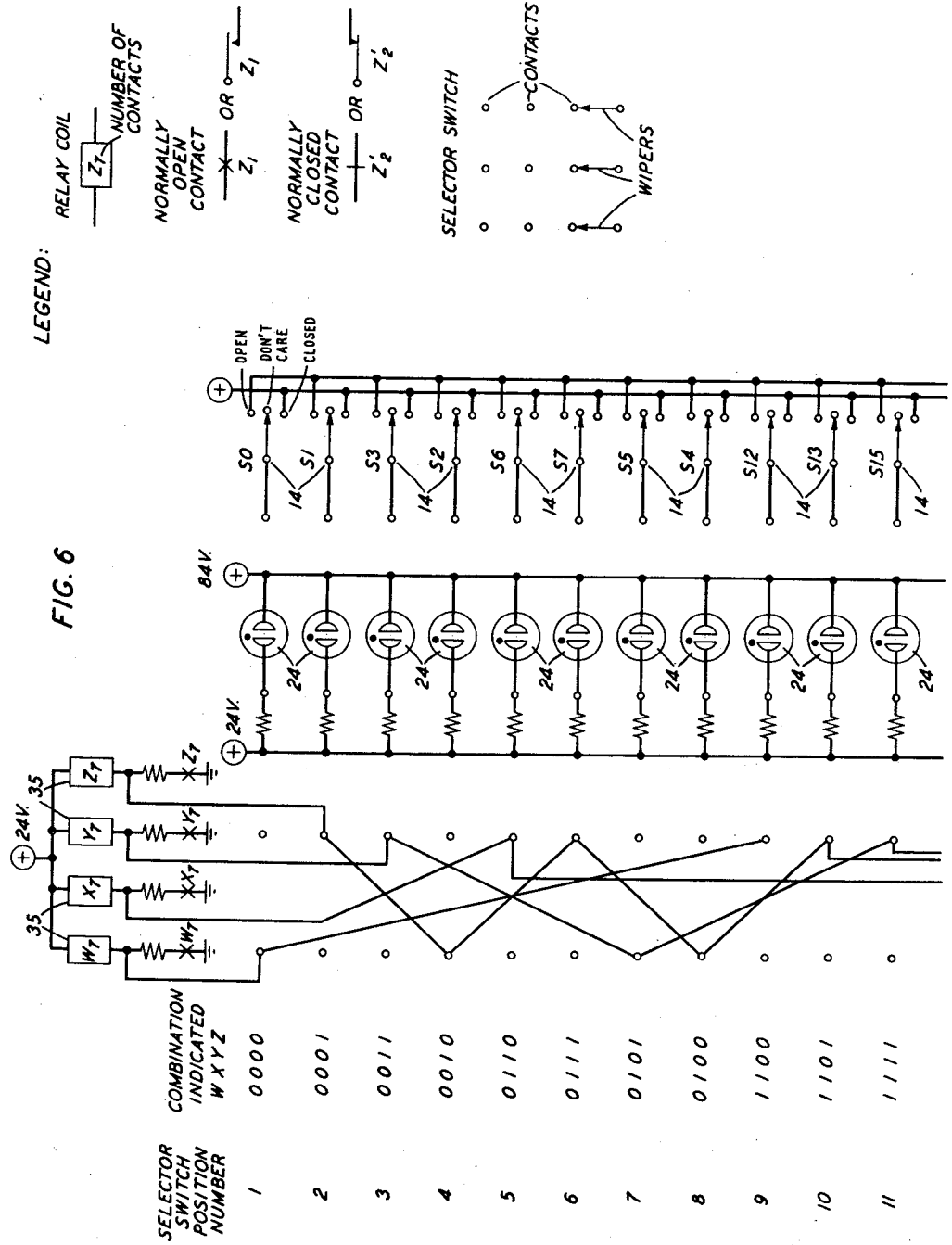

Figs. 4 through 9 are a schematic representation of one specific illustrative embodiment of this invention wherein the functions of comparing, evaluating and modifying circuits to be analyzed can be attained, Fig. 10 being a key diagram showing the arrangement of Figs. 4 through 9; and Fig. 11 is a schematic represenation of one specific illustrative embodiment of this invention wherein the function of proving the lower bound of the contact requirements of a circuit is attained.

Turning now to the drawing, Fig. 1 depicts the broad general aspects of one specific embodiment of this invention. As there seen, the fundamental elements include the circuit to be analyzed, which is in the apparatus, the functional circuit descriptions, which are registered in the apparatus, and some means for comparing the two and indicating the result of the comparisons. In order to determine redundancy of elements in the circuit being analyzed, circuit modifications are sequentially applied to the circuit to be analyzed and the comparisons made to determine whether the circuit, as modified, still complies with the circuit descriptions set up in the apparatus. By checking the circuit description set up in the apparatus, a lower bound for the number of contacts required can be found. The various elements of Fig. 1 are not intended to represent specific circuitry or components in the particular apparatus to be described with reference to the other figures, but rather the figure is intended to indicate in a quick and brief manner, the functional operation in accordance with this invention of the specific apparatus that is to be described.

The operation of the specific illustrative embodiment of this invention depicted in the drawing can be readily understood with reference to Figs. 1 and 2; the specific circuit elements employed and their relationships in accordance with this invention are described below with reference to Figs. 4 through 9 and 11. One specific illustrative embodiment that was constructed in accordance with this invention utilizes a top panel as depicted in Fig. 2, and employs sixteen three-position switches 14, which are used to specify the requirements of the circuit. One switch corresponds to each of the $2^4=16$ states in which four relays, identified as W, X, Y and Z, can be put. Switch No. 2 in the upper righthand corner, for instance, is labeled $W+X+Y'+Z$, which corresponds to the state of the circuit in which the relays labeled W, X and Z are operated, and the relay labeled Y is released. In this specification the relays are each designated with a particular letter and each contact of the relay by the same letter. A primed letter indicates a contact which is the negative of the contact designated by the same letter unprimed and, as is customary, an unprimed letter designates make or normally open contacts and a primed letter break or normally closed contacts. The subscript of the relay indicates the number of contacts of that relay and each set of contacts is identified by a subscript.

The three positions of each switch 14 correspond to the requirements which can be imposed on the condition of the circuit when the relays are in the corresponding state. Since any two-terminal relay contact circuit assumes only one of two values (open or closed), the inclusion of a third value (doesn't matter, don't care or vacuous, as it has been called) merits some explanation. If the machine, of which the relay circuit being designed is to be a part, only permits these relays to take on a fraction of the $2^n$ combinations of which $n$ relays are capable, then any circuits which agree on the combinations actually assumed will be functionally equivalent for use in the machine. Since the class of circuits which agrees with what is wanted just in the necessary combinations is larger than the class of those which agree in all combinations, the former class can and frequently will contain members using fewer contacts.

Hence the switch corresponding to each state is put into the "don't care" position if the circuit will never assume that state, or if for any other reason the behavior when in that state is immaterial. The sixteen three-position switches thus permit the user not only to require the circuit under consideration to have exactly some particular switching or hindrance function, but also allow the apparatus more freedom in the cases where the circuit need not be specified completely.

The left half of the front panel of the apparatus, as seen in Fig. 2, is a plugboard on which the circuit being analyzed can be represented. There are three transfers from each of the four relays, W, X, Y and Z brought out to jacks 18 on this panel, and two plugs 15 and 16 representing the terminals of the network are at the top and bottom. Using these, as well as some patch cords 17, it is possible to plug up any circuit using at most three transfers on each of the four relays. This number of contacts is sufficient to give a circuit representing any switching function of four variables.

If the specifications for the circuit have been put in the sixteen switches 14 and a circuit put on the plugboard then the apparatus, in accordance with this invention, can compare the circuit with the circuit requirements and indicate disagreement, if any, for a particular state of the relays. However, in some instances a circuit may have been designed for a particular system and it is desirable to determine in precisely what states of the relays the circuit will be open or closed. In this instance the setting of the switches 14 is immaterial, when the circuit has been registered on the plugboard the apparatus will evaluate it and indicate the behavior of the circuit.

When it is desired to evaluate a circuit that has been registered in the jack field, the main control 20 and evaluate-compare switch 21 are both set in the "evaluate" position. Then pressing the start button 22 will cause the apparatus to evaluate the circuit and to indicate in which of the states the circuit is closed by lighting up the corresponding indicator lamps 24.

If instead it were desired to compare a circuit registered on the plugboard with the circuit requirements set up on the switches 14, the evaluate-compare switch 21 is set to "compare," with the main switch still in the "evaluate" position, and the apparatus then checks whether the circuit disagrees with the requirements given on the switches 14. A disagreement is indicated by lighting the lamp 24 corresponding to the state in question. If a switch is set for closed and the actual circuit is open in that state, or vice versa, a disagreement is indicated, but no disagreement is ever registered when the switch is set in the "don't care" position, regardless of the circuit condition.

After a circuit has been found which agrees entirely with the requirements, the main control switch 20 is then turned to the "short test" position and the start button 22 is pressed again. The apparatus then determines whether any of the contacts in this circuit could have been shorted out, with the circuit still satisfying the requirements. The apparatus indicates on the lamps 27 beside the contacts which ones have this property.

After the short test has been performed, putting the main control switch 20 in the "open test" position permits the analyzer to perform another analogous test, this time opening the contacts one at a time.

The other operation which can be accomplished by this specific embodiment of this invention is done with the main control switch 20 in the "prove" position. Pressing the start button 22 and moving the other four-position switch 29 successively through the W, X, Y and Z positions, then certain of the eight lamps 30, designated, W, W', X, X', Y, Y', Z, Z', will light up. The apparatus has then carried out a proof as to which kinds of contacts are required to synthesize the function using the method of reduction to functions of one variable. In the operation the apparatus considers only the function specified by the sixteen three-position switches 14. If every circuit which satisfies these specifications requires a back or normally closed contact on the W relay, the W' light will go on, etc.

If, for instance, seven of the eight lights are on, any circuit for the function requires at least seven contacts, and if there is in fact a circuit which uses just seven, the machine has, in effect, given a complete proof that this circuit is minimal. Circuits for which the machine can give such a complete proof are fairly common, although there are also circuits, which can be shown to be minimal by more subtle methods of proof, which the particular embodiment of our invention described herein could not prove minimal. An example is the circuit of Fig. 3B. This circuit uses nine contacts, but in the "prove" position the apparatus merely indicates that at least eight contacts are necessary. It can be shown by other methods that the nine-contact circuit is minimal. But the apparatus always give a lower bound for the number of contacts.

Turning now to Figs. 4 through 9 there is depicted in schematic form a circuit illustrative of one specific embodiment of our invention for attaining the first four modes of operation described above, namely evaluating a circuit, comparing a circuit with desired characteristics, examining a circuit for contacts that can be shorted without affecting its operation, and examining for contacts that can be opened without affecting the circuit's operation. Considering first the evaluation of a circuit, in this mode of operation the apparatus goes through in sequence the sixteen possible states of four relays 35, identified as the W, X, Y and Z relays and seen in Fig. 6, and tests in each state whether or not the circuit is closed. The sixteen states are attained by connecting the relay coils between a source of positive potential and ground through a series connection of normally open contacts of the relays themselves and resistors. The side of the relay coils connected through the normally open contacts to ground are also connected in accordance with a modified binary code to various contacts on two levels or stages of a multilevel selector or step-by-step switch 36, seen on Figs. 6 and 9. In the specific embodiment depicted, an eighteen-contact selector switch with four levels of contacts was employed, each contact identifying a switch position, as indicated on the drawing. To aid in following the code by which the relays 35 are connected to two levels of contacts and thereby through wipers 38 and 39 to either a positive voltage source or ground, respectively, the combination indicated at each position of the selector switch 36 is also noted on the drawing in code form, a "0" indicating that the relay is unoperated and a "1" that the relay is operated.

As noted above, in this mode of operation all sixteen states of the W, X, Y and Z relays 35 are tested to determine whether or not the circuit is closed in each state. If it is closed, the corresponding panel light 24 is lit. In this operation the evaluate-compare switch 21 seen in Fig. 6 and the main control switch 20, which are four different contact levels seen in Figs. 7, 8, 9 and 11, are both in the evaluate position and the selector or stepping switch 36 goes through one complete sequence. The selector switch may be of any of several known types, reference being made to a description of rotary selector switches at page 179 et seq. of "The Design of Switching Circuits" by Keister, Ritchie and Washburn (D. Van Nostrand, N. Y., 1951) as exemplary of the types that may be employed. During this one sequence of the selector switch 36, the four relays W, X, Y and Z proceed sequentially through their sixteen states. This sequence is produced by the first two wipers 38 and 39 and decks or levels of the selector switch 36. At the first position (0000) all four relays are unoperated. At the second step (0001), ground on wiper 39 operates relay Z, which locks in on its own front contact $Z_1$. The circuit is then set to test the situation where W, X and Y are unoperated and Z is operated. At the third step (0011) relay Y is operated and locks in on its own front contact $Y_7$. At the fourth step relay Z is short-circuited by wiper 38 and thereby releases producing the state where W, X and Z are unoperated and Y is operated (0010). Proceeding in this manner it will be seen that the four relays W, X, Y and Z go through the sixteen states indicated.

The circuit being tested has been set up, by means of short plug cords 17, not shown in Figs. 4, 5, 7 and 8, plugged into the jacks 18 on the front panel. This circuit is connected between a plug 15, connected to ground, and a plug 16, connected through the winding of a relay G to a positive voltage supply, seen in Fig. 4, the plugs 15 and 16 are similarly placed in jacks 18, as seen on Fig. 2. This circuit being tested consists of a particular combination of contacts on the four relays W, X, Y and Z, two typical circuits being depicted in Figs. 3A and 3B, further discussed below. Actually as seen in the drawing, contacts on other relays, identified as H relays, are also involved in the circuit connected between the plugs 15 and 16, but in the present mode of operations these H relays are not operated.

For a given state of the relays W, X, Y and Z there will be a closed path between the plugs 15 and 16 only if the circuit being tested is closed for that state of the relays. The relay G, seen in Fig. 4, will therefore be operated only if the circuit being tested is closed in the state in question. If it is closed, a ground will be applied to a third wiper 41, seen in Fig. 9, of the selector switch 36 and this will cause the indicating lamp 24 corresponding to that particular state of the relays W, X, Y and Z to fire. If the circuit were not closed a positive voltage would be applied to neon lamp 24 to extinguish it, if it were already fired. Ground or the positive voltage are applied to wiper 41 through the compare-evaluate switch 21 and normally open or normally closed contacts $G_1$ or $G_2'$, respectively, as seen on Fig. 9. Indicating lamps 24 are advantageously neon lamps and the voltage normally across them is advantageously chosen so as to be between the fire and sustain voltages for the neon lamps. Consequently, if they are fired they will remain fired, and if extinguished they will remain out. In the specific embodiment depicted this voltage is 60 volts. Thus the lamps remain in the state produced by the evaluation of the circuit even after the wiper 41 has left the lamp in question.

Figure 7:
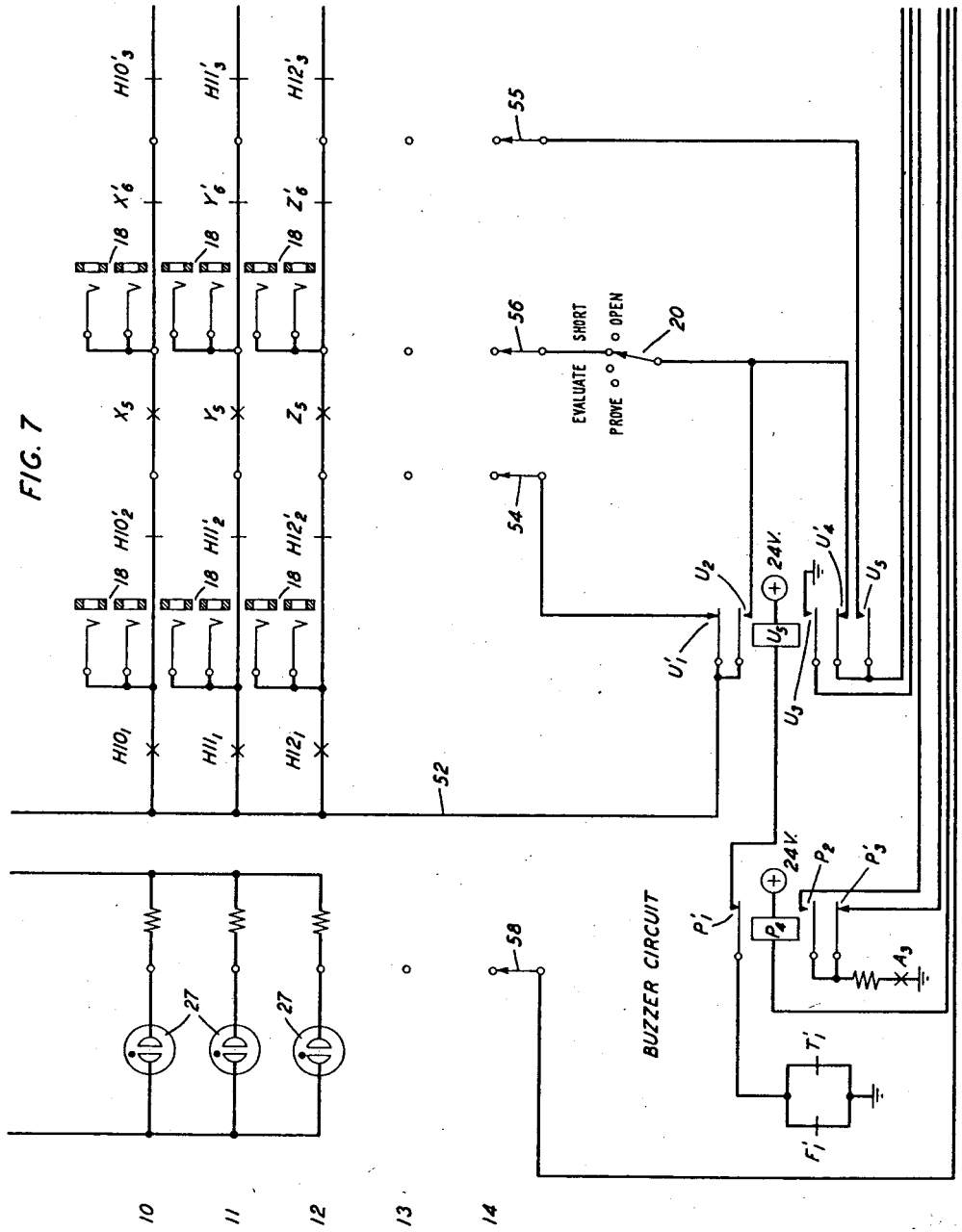
Figure 8:
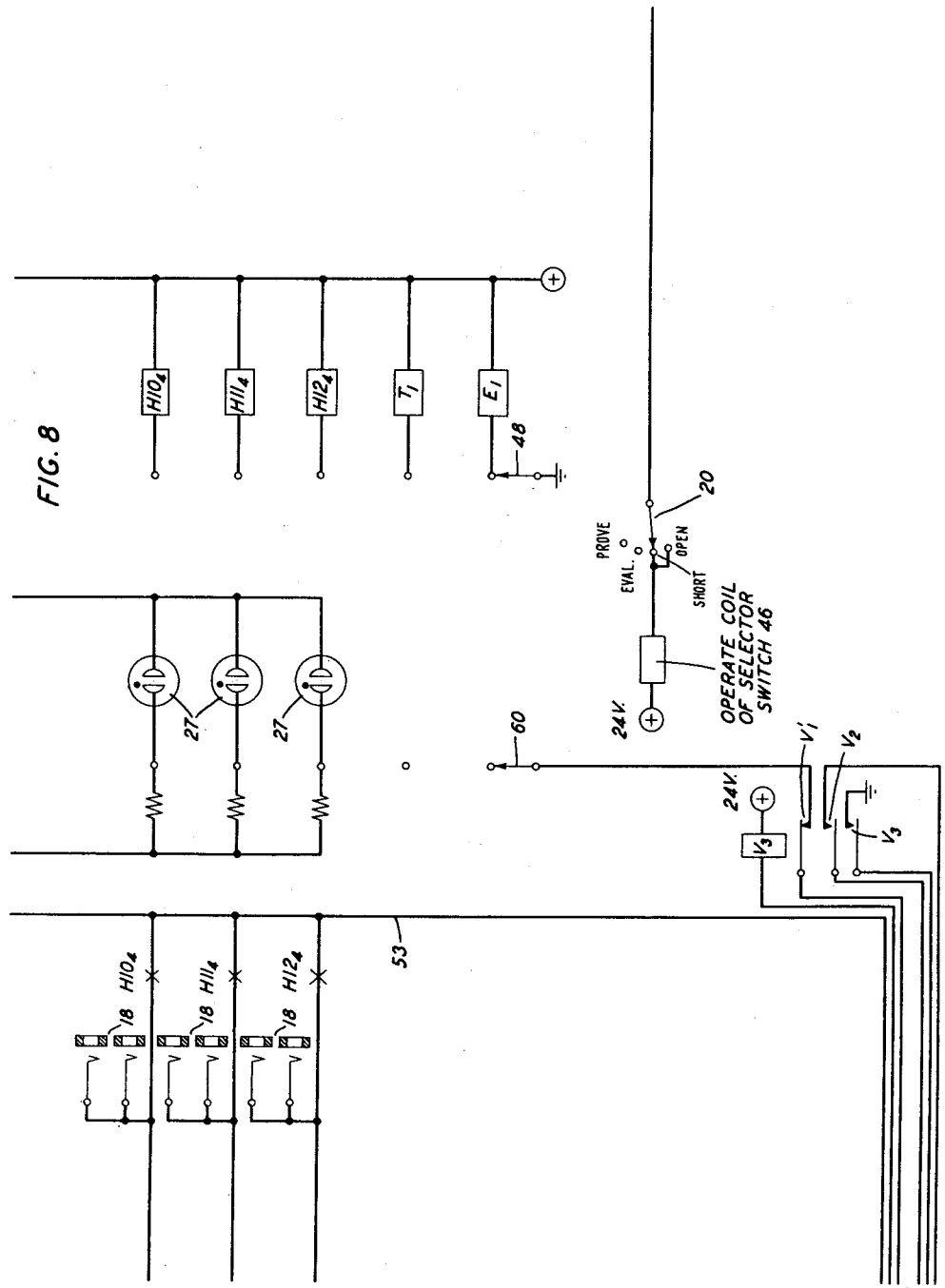

In this specific embodiment of our invention the movement of the stepping switch 36 is produced by a three-stage buzzer circuit consisting of relays U, V and P, as seen on Figs. 7 and 8. In the buzzing condition the normally closed contacts of the F and T relays, described further below, will be closed, causing operation of the U relay, which in turn energizes the V relay through the contacts $U_3$ in series with the winding of the V relay. Operation of relay V then energizes relay P similarly through contacts $V_3$ which in turn releases the U relay through the normally closed contacts $P_1'$, etc. Thus, in a manner known in the art, the P relay is alternately energized and released. As seen in Fig. 9, a normally open contact on the P relay is connected, through one level of main switch 20 which will be in the evaluate position for this mode of operation, to the operate coil of the selector switch 36 and the contacts and operate coil are connected between ground and a source of positive potential. Thus the alternate opening and closing of the contacts of the P relay will cause the operate coil of the selector switch 36 to advance the wipers of that switch one position at a time; the start button 22 is also connected between the operate coil of the selector switch 36 and ground, as discussed further below.

As the start of an evaluation of a circuit that has been registered in the jack field on the front panel of the apparatus, the main switch 20 and the evaluate-compare switch 21 will both be in the evaluate position, and the selector switch 36 at position 18, seen in Fig. 9, in which position wiper 39 applies ground to one side of a relay F so that the normally closed F contacts in the buzzer circuit are open; during this mode of operation the relay T is operated through selector switch 36 and the normally closed $T_1'$ contact of the buzzer circuit is also open. When the starting button 22 is pushed the coil of the stepping or selector switch 36 is energized and when the starting button is released, the coil of the switch 36 in turn releases and the stepping switch moves from position 18 to position 1. This releases relay F and the three-stage buzzer circuit can commence operation. At each cycle of this buzzer circuit the coil of the selector switch 36 is energized and released, as described above, and the W, X, Y and Z relays pass through their sixteen possible states. When the wipers of the selector switch 36 again reach position 18, relay F is operated, stopping the buzzer circuit and ending the test.

At the conclusion of the test the states of operation of the circuit being analyzed are indicated by the lamps 24 that have been fired, as discussed above.

In the comparison mode of operation, wherein it is desired to compare the possible states of a circuit that has been registered in the jack field and circuit requirements registered in the apparatus, the sixteen three-position switches 14 are employed to indicate the circuit requirements. In this mode of operation of this specific embodiment of our invention, if in any combination the circuit disagrees with the switch setting, the corresponding lamp 24 will light up. Each of the switches 14 has been numbered from S0 through S15, the number of the switch being the decimal equivalent of the binary number indicating the particular combination of W, X, Y and Z to which the switch 14 applies. These numbers are thus not in agreement with the particular positions of selector switch 36 to which the switches 14 are connected.

For this test the main switch 20 is set in the evaluate position and the evaluate-compare switch 21 in the compare position. When the starting button 22 is pressed, the buzzer circuit starts as before, cycling the selector switch 36 through one complete sequence. The four relays, W, X, Y and Z, as before, go through their sixteen possible states and the relay G, as before, operates or not depending on whether the circuit tested is closed or not. The lamps 24, however, are no longer controlled directly by relay G, but instead by contacts on a relay A, seen in Fig. 9, connected to the lamps 24 through the compare-evaluate switch 21. The relay A is connected to operate only if the circuit condition of the network being tested diagrees with the setting of the corresponding three-position switch 14. This is attained by having one side of the coil of relay A connected to a fourth wiper 43 on the selector switch 36 and through the wiper 43 to a plus voltage source, nothing, or ground, according to whether the desired behavior of the circuit in question is open, "don't care" or closed as indicated by the setting of the three-position switch 14. The other side of the coil of relay A is connected to a positive voltage source or to ground depending on whether the circuit being tested is closed or open, by means of normally open and normally closed contacts $G_3$ and $G_4'$, respectively. The relay A will therefore only operate if unlike voltages are applied to the two sides of its coil, and this will only occur if the setting of switch 14 differs from the state of the circuit being tested as indicated by the condition of the relay G. If such a disagreement occurs the corresponding lamp 24 is fired by a ground applied by the wiper 41 of the selector switch 36.

In this mode of operation the starting and stopping procedures are the same as in the prior mode of operation.

In testing for contacts in the circuit that can be shorted, the sequencing is somewhat more involved. Roughly speaking, the various contacts used in the circuit are short-circuited one-by-one, and for each contact the circuit goes through a sequence similar to the comparing mode of behavior just described and compares the circuit when this contact is shorted with the desired characteristics set up on the three-position switches. If any disagreement is found, the neon lamp 27 associated with the contact in question is fired, indicating that this contact is necessary in the circuit and cannot be shorted. Actually, the sequence is a bit more complicated since to save time and equipment the tests on the make and break parts of a transfer in the circuit being tested are interleaved.

In this specific illustrative embodiment of our invention a second stepping or selector switch 46 is utilized, the switch advantageously having six decks and 14 positions, seen in Figs. 4, 5, 7 and 8. At the start of a short test, with main switch 20 in the short position, selector switch 36 will be at position 18 so that relay F is energized and selector switch 46 will be at position 13 so that relay T, seen in Fig. 8, is energized. Energization of both relays F and T opens their normally closed contacts in the buzzer circuit, Fig. 7, and prevents the buzzer circuit from operating. In this test the position of the evaluate-compare switch 21 is irrelevant. When the start button 22 is pressed, the coils of both selector switches are energized and when the start button is released both step ahead one position thereby releasing relays F and T and permitting the buzzer circuit to start. The first step of selector switch 46 moves its wiper 48 from applying ground to the T relay to applying ground to a relay E, at position 14. Operation of relay E opens its single normally closed contact, seen in Fig. 4, removing the high positive potential from indicating lamps 29, thereby extinguishing any indication in these lamps of the results of a prior test.

Selector switch 36 then proceeds through a complete sequence. At step 17, wiper 39 of selector switch 36 applies ground to the operate coil, seen in Fig. 8, of selector switch 46, thereby causing switch 46 to advance one position. This causes selector switch 46 to advance from position 14 to position 1, thereby releasing relay E and reapplying voltage to the indicating lamps 27. Wiper 48 now operates the first of a row of H relays, the numbers of the H relays indicating the position of the selector switch 46 at which the relay is energized. Operation of relay H1 disconnects the first W transfer from the circuit being tested, by opening the normally closed contacts H1$_2$' and H1$_3$' of the H1 relay on opposite sides of the W$_1$ and W$_2$' contacts in position one of the selector switch. Operation of the H1 relay also closes normally open contacts H1$_1$ and H1$_4$ and connects the outer jacks 18 in position one to leads 52 and 53, respectively. One side of each of the W$_1$ and W$_2$' contacts are at this time connected to wipers 54 and 55, respectively, of the selector switch and the center jacks are directly connected to wiper 56.

To test whether either part of this particular W transfer, i. e., whether contacts W$_1$ or W$_2$', in the first position of the selector switch can be shorted without affecting the behavior of the circuit being tested, selector switch 36 goes through a complete cycle, putting relays W, X, Y and Z in each possible state as in priorly described modes of operation. In each state, lead 52 is first directly connected to wiper 56, thereby shorting out the W$_1$ contact, and the circuit state is compared with the desired specification on the three-position switch 14 at that position of selector switch 36. This shorting occurs in the buzzer cycle during the period that the U relay is operated, which causes normally open contact V$_2$ between lead 52 and wiper 56 to be closed; at the same time lead 53 is connected to wiper 55 through contact U$_5$. A disagreement between the circuit behavior and that specified by a switch 14 operates relay A, as before. By closing the normally open contact A$_1$, seen in Fig. 7, of relay A connected between wiper 58 of selector switch 46 and ground, operation of relay A fires the indicating lamp 27 connected at position one of the selector switch and corresponding to the W contacts tested. In this specific embodiment the normally open contact A$_1$ is connected to the lamp 27 through contacts V$_2$ and P$_3$' in series. This gives relay A time to operate or release from a previous operation before its reading is applied to the lamp and also disconnects the lamp before the state of A is changed by the next operation.

The second test in the same buzzing cycle is to short the normally closed contact W$_2$' of the transfer connected in position one of the selector switch. This occurs when relay U releases, thereby allowing contact U$_4$' to assume its normally closed condition and connect lead 53 to wiper 56, and at the same time contact U$_1$' closes and connects lead 52 to wiper 54. The normally open contact W$_1$ is now connected as usual in the circuit being tested, via the now closed contact H1$_1$, the closed contact U$_1$', and wiper 54, and the points previously connected by the contact W$_2$' are now shorted. In this part of the buzzing cycle the contact A$_3$ of the disagreement relay is connected via contacts P$_2$ and V$_1$', for timing margins similar to the employment of contacts P$_3$' and V$_2$ before, to a wiper 60, seen in Fig. 8, and through wiper 60 to the lamp 27 in position one of the selector switch corresponding to the W$_2$' or normally closed contact of the relay W in that position. This lamp will fire, as before, if a disagreement occurs indicating that the contact is necessary.

After the selector switch 36 has proceeded through all states, by stepping in sequence from positions one through 16, wiper 39 at position 17 applies a ground to the coil of selector switch 46 thereby advancing it one position. The apparatus now applies the shorting test to the X$_1$ and X$_2$' contacts connected at position two of the selector switch 46. Proceeding in this manner all the contacts in the twelve positions of the selector switch 46 are tested. On reaching position 16, wiper 48 applies ground to relay T, causing the normally closed T$_1$' contact in the buzzing circuit to open. At the same time the first selector switch is pulsed by the buzzing circuit from position 17 to position 18 where ground is applied to relay F, thereby opening the normally closed contact F$_1$' in the buzzer circuit and the buzzer stops.

If it is desired to hurry the apparatus through the latter part of the test, as if, for example, only a few of the available contacts are being used and these are all located near the top of the jack field, the reset button 61 may be pressed, thereby causing selector switch 46 to run rapidly to the stop position 13.

In the mode of operation wherein the apparatus analyzes whether any of the contacts in the circuit being tested may be omitted without changing the behavior of the circuit, the test proceeds as described for the short circuit test except that the main control switch 20 is placed in the "open" position thereby opening the possible connections between wiper 56 of selector switch 46 and the leads 52 and 53, as seen in Fig. 7. This opens the short that was applied in the previous test between the points normally connected to the contact being tested. Operation of relay A, and thus the lighting or not of indicator lamps 27, therefore indicates the behavior of the circuit being tested when the different contacts are opened.

Turning now to Fig. 3A there is illustrated a relay circuit employing normally closed and open contacts of the four relays W, X, Y and Z which is typical of the type of circuit which may be analyzed by apparatus in accordance with this specific embodiment of our invention. It should be noted that a much simpler circuit is shown set up by the short wires 17 in the jack field on Fig. 2 in order not to obfuscate the drawing. The circuit of Fig. 3A is one which is quite difficult to analyze by prior methods of calculation and engineering effort; however, when placed on the specific embodiment of our invention herein described, the apparatus was able to determine in less than two minutes, including the time required to plug the circuit into the plugboard, that the circuit had in fact been inefficiently designed and that one of the contacts could be shorted out, the corrected circuit being depicted in Fig. 3B. While Figs. 3A and 3B are very similar in appearance, except for the redundant Y' contacts in Fig. 3A, in many cases the circuit after analysis by apparatus in accordance with our invention looks quite dissimilar to the circuit analyzed. This is particularly true in those cases where contacts may be opened as well as shorted.

Turning now to Fig. 11 the circuit elements utilized in this specific illustrative embodiment of our invention in the mode of operation wherein the apparatus proves a lower bound for the number of contacts are there depicted in schematic form and apart from the other circuit elements, described above, to facilitate an understanding of this mode of operation. In this test the three-position switches 14 are each set to the desired circuit behavior for the 16 possible states and the prove switch, 29 clearly seen on the front panel depicted in Fig. 2, is manually set to each of four possible positions in succession, the positions being identified as W, X, Y and Z. If certain contacts are essential to any circuit which realizes the switching functions set up on the switches 14, then the indicating lamp 30 corresponding to those contacts will light up. Thus when switch 29 is in the W position the apparatus tests whether W and then whether W' contacts are necessary. As can be seen in Fig. 11, switch 29 is a ten-level switch so that turning the switch will change the arrangement of the apparatus at ten places.

The method of operation of the apparatus is based on the following result in switching theory: at least one normally open W contact is necessary in any realization of a given switching function if there are one or more states of the other relays (X, Y and Z) such that when the X, Y and Z relays are in such a state, changing the W relay from unoperated to operated changes the function from open to closed. At least one normally closed W' contact is necessary if there exists a state of the X, Y and Z relays such that when they are in this state, operating the W relay changes the circuit from closed to open. These are both obvious, since the only way by which operating the W relay alone could close a previously open circuit is by establishing an operating path through a make contact on the W relay, and similarly for the condition with a break contact.

The condition that a W contact is necessary can also be thought of geometrically in the following way. The 16 states of the four relays can be thought of as the vertices of a four-dimensional cube. This cube consists of two three-dimensional subcubes, the first being the eight states of the X, Y, Z relays with W not operated, and the second, the eight states of the X, Y, Z relays with W operated. If there is any point in the "W unoperated" cube in which the circuit is open while being closed in the corresponding point of the "W operated" cube, at least one W contact is necessary and similarly if there is any point in the "W unoperated" cube in which the circuit is closed while being open in the corresponding part of the "W operated" cube at least one W' contact is necessary.

The circuit depicted in Fig. 11 can best be understood in terms of this geometrical picture. A two-terminal network is set up corresponding to this cube, the terminals being connected to leads 62 and 63. Every vertex of the cube for which the circuit should be closed is connected to lead 62; all vertices for which the circuit should be open are connected to lead 63. These vertices are determined by the positions of switches 14 with "don't care" points left floating. When testing for the necessity of W or W' contacts, eight diodes 65 are connected between corresponding points of the three-dimensional subcubes mentioned above. These conduct in the direction from the "W unoperated" subcube to the "W operated" subcube. Current will pass from lead 62 to lead 63 only if a W contact is necessary. This is true since this conduction can take place only by entering the cube at a closed state, which is connected to lead 62, passing through a diode 65 in the conducting direction, which requires that the closed state be in the "W unoperated" cube, and leaving the cube to lead 63 at an open state. Thus the conditions for conduction from lead 62 to lead 63 are identical with the conditions for necessity of a W contact. In a similar manner, it may be seen that the network will conduct from lead 63 to lead 62 only if a W' contact is necessary.

In operation, the circuit is alternately tested for conduction in the two directions. The alternation is obtained by operation of a buzzer circuit utilizing a relay R which may advantageously be the three-stage buzzer previously described. When relay R is operated, the circuit is tested for conduction from lead 62 to lead 63. If this condition occurs, it fires the corresponding neon lamp 30 for the normally closed W, X, Y or Z contact. When relay R is released, voltage is applied to the network in the reverse direction and if conduction occurs, it fires the corresponding neon lamp 30 for the normally open W', X', Y' or Z' contact. These lamps 30 remain fired until released as by operating switch 68.

Although it has been explained that the circuit for doing these tests is laid out in the shape of a four-dimensional cube, the circuit diagram of Fig. 3 is not drawn by the use of a direct projection of such a cube, but is laid out in a plane by a method discussed at page 174 of "The Design of Switching Circuits," above referred to, which method simplifies its appearance.

While a specific illustrative embodiment of this invention has been described wherein circuit configurations of contacts on a given number of relays are analyzed, it is to be understood that this invention is not limited to the analysis of these particular elements controlled by these particular multistate devices or to any particular number of such elements and multistate devices. Thus this invention is equally applicable to the analysis of circuits employing discharge devices, transistors, etc., wherein certain elements are controlled by a change in conditions of a multistate device. Thus a number of discharge devices may be utilized as the elements of the circuit being analyzed, the devices being arranged in groups having conduction therethrough dependent on the state of a control device, which may itself be a discharge device.

Further it is to be understood that the above-described embodiment of the circuit analyzer is also merely illustrative of the application of the principles of the invention. Numerous other combinations may be devised by those skilled in the art without departing from the spirit and scope of the invention. Thus alternative means may be utilized for registering the circuit configuration to be analyzed and the functional requirements of the circuit being analyzed. Similarly other means may be devised for causing the multistate devices or relays sequentially to assume all possible combinations of their states. Thus while the above-described arrangement comprises a preferred embodiment of this invention, the invention is not to be considered as limited thereto.

What is claimed is:

1. Apparatus for analyzing electrical circuits comprising first means for registering pluralities of circuit configurations of elements controlled by multistate devices, second means for registering the possible functional requirements to be satisfied by the circuit configuration in each of the possible states of said devices, means for sequentially comparing each of said possible circuit requirements in said second means with the behavior of said circuit configurations in said first means, and means including said comparing means indicating agreement between said circuit requirements in said second register means and the behavior of said circuit configurations in said first register means.

2. Apparatus for analyzing electrical circuits in accordance with claim 1 comprising further means for individually and sequentially removing each of said elements controlled by said multistate devices from said circuit configuration in said first register means, and means including said comparing means and said indicating means for sequentially comparing the circuit behavior of said circuit configuration with said functional requirements set up in said second register means as each element is removed from said circuit configuration and indicating agreement between said circuit requirements in said second register means and said circuit configuration in said first register means when said elements have been individually removed, thereby indicating that the particular circuit configuration being analyzed utilizes an excess number of said elements.

3. Apparatus for analyzing electrical circuits comprising first means for registering pluralities of circuit configurations of elements controlled by multistate devices, said first register means comprising a plurality of said elements and means interconnecting said elements, second means for registering the possible functional requirements to be satisfied by the circuit configuration in each of the possible states of said devices, each second register means comprising a plurality of switches each connected to a first voltage if a function is required, to a second voltage if it is not to occur, and unconnected if it is immaterial if the circuit configuration has that function, means for sequentially comparing each of said possible circuit requirements in said second register means with the behavior of said configurations in said first register means, said comparing means including said multistate devices and means for causing said devices sequentially to assume all possible combinations of states of said devices to operate said elements in said configuration, and means including said comparing means indicating agreement between the behavior of said circuit configuration and said functional requirements set up on said switches.

4. Apparatus for analyzing electrical circuits in accordance with claim 3, comprising further means for individually and sequentially removing each of said elements controlled by said multistate devices from said circuit configuration in said first register means, and means including said comparing means and said indicating means for sequentially comparing the circuit behavior of said circuit configuration with said functional requirements set up in said second register means as each element is removed from said circuit configuration and indicating agreement between said circuit requirements in said second register means and said circuit configuration in said first register means when said elements have been individually removed, thereby indicating that the particular circuit configuration being analyzed utilizes an excess number of said elements.

5. Apparatus for analyzing electrical circuits in accordance with claim 4 wherein said means for individually and sequentially removing each of said elements from said circuit configuration comprises means for sequentially shorting each of said elements.

6. Apparatus for analyzing electrical circuits in accordance with claim 4 wherein said means for individually and sequentially removing each of said elements from said circuit configuration comprises means for sequentially open-circuiting each of said elements.

7. Apparatus for analyzing electrical circuits comprising first means for registering a circuit configuration of elements controlled by multistate devices and connected between two terminals, said first register means comprising a plurality of said elements and means interconnecting said elements between said terminals, second means for registering the possible functional requirements to be satisfied by the circuit configuration in each of the possible states of said devices, means for sequentially comparing each of said possible circuit requirements in said second register means with the behavior of said configuration in said first register means, said comparing means including said multistate devices, means for causing said devices sequentially to assume all possible combinations of states of said devices to operate said elements in said configuration and control means responsive to a closed circuit between said terminals, and means indicating agreement between the behavior of said circuit configuration and said functional requirements set up in said second register means comprising indicating means individual to each possible circuit behavior and controlled by said control means and said functional requirements in said second register means.

8. Apparatus for analyzing electrical circuits in accordance with claim 7 comprising further means for individually and sequentially removing each of said elements controlled by said multistate devices from said circuit configuration in said first register means, and means including said comparing means and said indicating means for sequentially comparing the circuit behavior of said circuit configuration with said function requirements set up in said second register means as each element is removed from said circuit configuration and indicating agreement between said circuit requirements in said second register means and said circuit configuration in said first register means when said elements have been individually removed, thereby indicating that the particular circuit configuration being analyzed utilizes an excess number of said elements.

9. Apparatus for analyzing electrical circuits comprising first means for registering a circuit configuration of elements controlled by multistate devices and connected between two terminals, said first register means comprising a plurality of elements and means interconnecting said elements between said terminals, second means for registering the possible functional requirements to be satisfied by said circuit configuration in each of the possible states of said devices, said second register means comprising a plurality of switches each connected to a first voltage if a function is required, to a second voltage if a function is not to occur, and unconnected if it is immaterial if the circuit configuration have that function, means for sequentially comparing each of the possible circuit requirements in said second register means with the behavior of said configuration in said first register means, said comparing means including said multistate devices, means for causing said multistate devices sequentially to assume all possible combinations of states of said devices to operate said elements in said configuration, and control means responsive to a closed circuit between said terminals connected to one of two voltages, and means indicating agreement between the behavior of said circuit configuration and said functional requirements set up on said switches in said second register means comprising indicating means individual to each possible circuit behavior controlled by voltage connected to said control means and a voltage connected to said switch.

10. Apparatus for analyzing electrical circuits in accordance with claim 9 comprising further means for individually and sequentially removing each of said elements controlled by said multistate devices from said circuit configuration in said first register means, and means including said comparing means and said indicating means for sequentially comparing the circuit behavior of said circuit configuration with said functional requirements set up in said second register means as each element is removed from said circuit configuration and indicating agreement between said circuit requirements in said second register means and said circuit configuration in said first register means when said elements have been individually removed, thereby indicating that the particular circuit configuration being analyzed utilizes an excess number of said elements.

11. Apparatus for analyzing electrical circuits in accordance with claim 10 wherein said means for individually and sequentially removing each of said elements from said circuit configuration comprises means for sequentially shorting each of said elements.

12. Apparatus for analyzing electrical circuits in accordance with claim 10 wherein said means for individually and sequentially removing each of said elements from said circuit configuration comprises means for sequentially open-circuiting each of said elements.

13. Apparatus for analyzing electrical circuits comprising first means for registering a circuit configuration of contacts of a given number of relays and connected between two terminals, said first register means including a plurality of said contacts and means interconnecting said contacts between said terminals, second means for registering the possible functional requirements to be satisfied by said circuit configuration in each of the possible states of said relays, said second register means including a switch for each possible combination of states of said relays, said switches being connected to a first voltage if a circuit function is required, to a second voltage if a circuit function is not to occur, and unconnected if it is immaterial if the circuit configuration have that function, means for sequentially causing said relays to assume all possible combinations of states thereof, means for comparing the behavior of said circuit configuration for each possible combination of states of said relays with the functional requirements registered in said second register means for said combination of states of said relays, said comparing means including circuit means responsive to a closed circuit between said terminals and connected to one of two voltages, and means indicating agreement between the behavior of said circuit configuration and said functional requirements set up on one of said switches comprising indicating means individual to each possible circuit behavior and controlled by a voltage connected to said circuit means and a voltage connected to said switch.

14. Apparatus for analyzing electrical circuits in accordance with claim 13 wherein said means for sequentially operating said relays comprises a stepping switch to contacts of which at different positions of said stepping switch said relays are connected, each of said indicating means is connected to a contact of said stepping switch and the voltage applied to the wiper associated with the contacts of said stepping switch to which said indicating means are connected is determined by said voltage connected to said circuit means and said voltage connected to said switch.

15. Apparatus for analyzing electrical circuits comprising first means for registering pluralities of circuit configurations of contacts on a given number of relays, second means for registering the possible functional requirements to be satisfied by the circuit configurations in each of the possible states of the relays, means for individually and sequentially removing each of said contacts from said configurations in said first register means, means for sequentially comparing each of said possible circuit requirements in said second register means with the behavior of said circuit configurations in said first register means, and means including said comparing means indicating agreement between said circuit requirements in said second register means and the behavior of said circuit configurations in said first register means when said contacts have been individually removed, thereby indicating that the particular circuit configuration being analyzed utilizes an excess number of said contacts.

16. Apparatus for analyzing electrical circuits comprising first means for registering a circuit configuration of pluralities of contacts of a given number of relays, said first register means comprising a plurality of said contacts, a pair of terminals, and means interconnecting said contacts between said terminals, second register means for registering the possible functional requirements to be satisfied by the circuit configuration in each of the possible states of said relays, means for sequentially comparing each of said possible circuit requirements in said second register means with the behavior of said circuit configuration in said first register means, said comparing means including said relays, means for causing said relays sequentially to assume all possible combinations of states to operate said contacts, and circuit means responsive to a closed circuit between said terminals, and means indicating agreement between the behavior of said circuit configuration and each of said functional requirements set up in said second register means comprising indicating means individual to each possible circuit requirement and controlled by said circuit means and said functional requirement set up in said second register means.

17. Apparatus for analyzing electrical circuits comprising means for registering a circuit configuration of elements controlled by multistate devices, means for sequentially operating said multistate devices to cause said devices to assume all possible combinations of states of said devices, means for determining the condition of said circuit configuration for each combination of states of said devices, and indicating means associated with each of said combinations of states of said devices actuated by said means determining the condition of said circuit configuration.

18. Apparatus for analyzing electrical circuits comprising means for registering a circuit configuration of elements controlled by multistate devices and connected between two terminals, said register means comprising a plurality of said elements and means interconnecting said elements between said terminals, means for sequentially operating said multistate devices to cause said devices to assume all possible combinations of states of said devices, means for determining whether said circuit configuration defines a functionally operative path between said terminals for each combination of states of said devices, indicating means associated with each of said combinations of states of said devices, and means responsive to a functionally operative circuit between said terminals for applying a voltage to said indicating means to cause each indicating means to indicate the condition of the circuit configuration for said possible combination of states of said devices associated therewith.

19. Apparatus for analyzing electrical circuits comprising means for registering a circuit configuration of contacts on a given number of relays and connected between two terminals, said register means comprising a plurality of said contacts, a pair of terminals, and means interconnecting said contacts between said terminals, means for sequentially operating said relays to cause said relays to assume all possible combinations of states thereof, means for determining whether said circuit configuration defines a closed path between said terminals for each combination of states of said relays, indicating means associated with each of said combinations of states of said relays and means responsive to a closed circuit between said terminals for applying a voltage to said indicating means to cause each indicating means to indicate the condition of the circuit configuration for the combination of states of said devices associated therewith.

20. Apparatus for analyzing electrical circuits in accordance with claim 19 wherein said means for sequentially operating said relays comprising a stepping switch, said relays being connected to contacts at different positions of said stepping switch, each of said indicating means is connected to a contact at a different position of said stepping switch, and said means for applying a voltage to said indicating means includes a wiper of said stepping switch connected sequentially to said contacts connected to said indicating means.

21. Apparatus for analyzing electrical circuits comprising a plurality of means for individually registering the possible behavior requirements to be satisfied by a circuit configuration of contacts controlled by $n$ relays, means for connecting each of said registering means in a circuit such that each of said registering means is at a vertex of an $n$-dimensional cube, means connecting a first potential to each of said registering means wherein it is required that the circuit be closed, means connecting a second potential to each of said registering means wherein it is required that the circuit be open, unidirectional current means between vertices the behavior requirements of which include different states of any one of said relays, and means detecting the flow of current between two of said last-mentioned vertices.

22. Apparatus for analyzing electrical circuits comprising a plurality of means for individually registering the possible behavior requirements to be satisfied by a circuit configuration of contacts controlled by $n$ relays, means for connecting each of said registering means in a circuit such that each of said registering means is at a vertex of an $n$-dimensioned cube, means connecting a first potential to each of said registering means wherein it is required that the circuit be closed, means connecting a second potential to each of said registering means wherein it is required that a given circuit be open, unidirectional current means, means for connecting said unidirectional current means between vertices the behavior requirements of which include a different state of each of said relays, and means for detecting the flow of current between two of said last-mentioned vertices.

23. Apparatus for analyzing electrical circuits comprising means for registering the possible behavior requirements to be satisfied by a circuit configuration of elements of $n$ two-state devices, said registering means comprising a plurality of switches, means for connecting said switches in a circuit such that each of said switches is at a vertex of an $n$-dimensioned cube, means connecting a first potential to each of said switches for which the behavior requirement of that switch must be present, means connecting a second potential to each of said switches for which the behavior requirement of that switch must not be present, unidirectional current means between vertices representing opposite states of any one of said devices, and means detecting the flow of current between two of said last-mentioned vertices.

24. Apparatus for analyzing electrical circuits in accordance with claim 23 and further comprising switching means for connecting said unidirectional current means between vertices representing opposite states of each of said devices when it is desired to test for the necessity of elements of each of said devices individually.

25. Apparatus for analyzing electrical circuits comprising means for registering the possible behavior requirements to be satisfied by a circuit configuration of elements of $n$ two-state devices, said registering means comprising a plurality of three-position switches, means connecting a first potential to each of said switches if the behavior requirement represented by said switch must be present, means connecting a second potential to each of said switches if the behavior requirement represented by said switch must not be present, said switches being unconnected if it is immaterial whether the behavior requirement be present or not, means for connecting said switches in a circuit such that each of said switches is at a vertex of an $n$-dimensioned cube, and means for testing for the necessity of each of said elements in the circuit whose requirements are represented by the setting of said switches, said testing means including a plurality of unidirectional current means, switching means for inserting said unidirectional current means between vertices representing opposite states of the particular device the necessity of the elements of which is to be tested, and means indicating the flow of current through said unidirectional devices.

26. Apparatus for analyzing electrical circuits comprising a rotary selector switch having a plurality of contact levels, a plurality of switches connected to contacts of a first level of said selector switch, each switch being assigned a particular circuit functional requirement for a circuit of elements controlled by multistate devices, means applying a first potential to said switches if the functional requirement assigned thereto must be present, means applying a second potential to said switches if the functional requirement assigned thereto must not be present, a plurality of multistate devices, means connecting said devices to contacts of levels of said selector switch so that said devices assume all possible combinations of states thereof as said selector switch is stepped, means for registering a particular circuit configuration of said elements controlled by said multistate devices, said register means comprising a plurality of said elements, a pair of terminals, and means interconnecting said contacts between said terminals, means for stepping said selector switch one position at a time, circuit means operated by a closed circuit connection between said two terminals at each position of said selector switch, and means comparing said potentials applied to said switches and said circuit means to indicate agreement and disagreement between the functional requirement set up in said switches and the behavior of said circuit configuration.

27. Apparatus for analyzing electrical circuits in accordance with claim 26 further comprising a second selector switch having a plurality of levels of contacts, means connecting elements of one of said devices between contacts of the same position of said second selector switch, said elements defining said register means, a plurality of relay means each connected to a contact of another level of said second selector switch, means including the contacts of said relay means for removing said elements at each position of said second selector switch from said circuit configuration in said register means, and means for stepping said second selector switch one position on each complete cycle of said first selector switch.

28. A device for obtaining electrical circuit configurations of elements controlled by multistate devices having a given functional behavior, comprising means for registering in the device the desired behavior of the configurations, means for registering in the device a particular circuit configuration, means for systematically modifying said particular circuit configuration, and means for indicating modified circuit configurations of said particular circuit configuration which satisfy the behavior stored in said first-mentioned register means.

29. A device for obtaining electrical circuit configurations of elements of multistate devices from among a class of such configurations, comprising means including a plurality of switches for registering in the device the desired behavior of the configurations, means for registering in the device a particular circuit configuration, means for automatically performing successive modifications of said particular circuit configuration in accordance with a previously described rule, and means for indicating modfied circuit configurations of said particular circuit which satisfy the behavior stored in said first-mentioned register means.

References Cited in the file of this patent
UNITED STATES PATENTS 2,328,750   Smith et al. _____ Sept. 7, 1943